US012699701B2

(12) United States Patent
Acharya et al.

(10) Patent No.: US 12,699,701 B2
(45) Date of Patent: Aug. 4, 2026

(54) METHOD AND A SYSTEM FOR NORMALIZING DATA IN DATA PROCESSING PIPELINES

(71) Applicant: Honeywell International Inc., Charlotte, NC (US)

(72) Inventors: Bhabesh Acharya, Bangalore (IN); Kumaresh Baabu, Madurai (IN); Kotni Ashutosh, Bhubaneswar (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/665,561

(22) Filed: May 16, 2024

(65) Prior Publication Data

US 2025/0298805 A1      Sep. 25, 2025

(30) Foreign Application Priority Data

Mar. 21, 2024    (IN) ............................. 202411021571

(51) Int. Cl.
| | |
|---|---|
| *G06F 16/2457* | (2019.01) |
| *G06F 16/2453* | (2019.01) |
| *G06F 16/2458* | (2019.01) |
| *G06F 16/25* | (2019.01) |

(52) U.S. Cl.
CPC .. *G06F 16/24573* (2019.01); *G06F 16/24539* (2019.01); *G06F 16/2477* (2019.01); *G06F 16/254* (2019.01)

(58) Field of Classification Search
CPC ......... G06F 16/24573; G06F 16/24539; G06F 16/2477; G06F 16/254
See application file for complete search history.

(56) References Cited

U.S. PATENT DOCUMENTS

| | | | | |
|---|---|---|---|---|
| 12,001,467 B1 * | 6/2024 | U | ............................. | G06F 16/35 |
| 2010/0106747 A1 * | 4/2010 | Honzal | ................. | G06F 16/283 707/E17.005 |

(Continued)

*Primary Examiner* — William P Bartlett
(74) *Attorney, Agent, or Firm* — Alston & Bird LLP

(57) ABSTRACT

The present disclosure provides a method and system for normalizing data related to assets in a business environment. The method comprises receiving at least one data from one or more assets within an enterprise and parsing the at least one data to identify at least one asset type. The method further comprises dynamically generating a structured query language (SQL) query corresponding to the at least one asset type and storing the SQL query in a metadata repository. The method further comprises executing the SQL query from the metadata repository on the at least one data. The method further comprises normalizing the at least one data by merging the results of the executed SQL query with the at least one data, and at least one configuration data to populate a dimensional model in real time, wherein the at least one configuration data comprises metadata associated with the one or more assets and an ontology model representing at least one of attributes, characteristics and relationships associated with the one or more assets. The method further comprises dynamically updating the at least one configuration data with the normalized data. A data processing system for normalizing data related to assets is also disclosed.

19 Claims, 7 Drawing Sheets

(56)        References Cited

U.S. PATENT DOCUMENTS

2016/0041997 A1*  2/2016  Gokhale ............... G06F 16/258
                                            707/694
2019/0377817 A1*  12/2019  McCluskey ........... G06F 16/258
2021/0152572 A1*  5/2021  Madi ................... H04L 63/1433
2021/0224300 A1*  7/2021  Rayner .............. H04L 63/0807
2024/0220501 A1*  7/2024  Zhang .............. G06F 16/24539

* cited by examiner

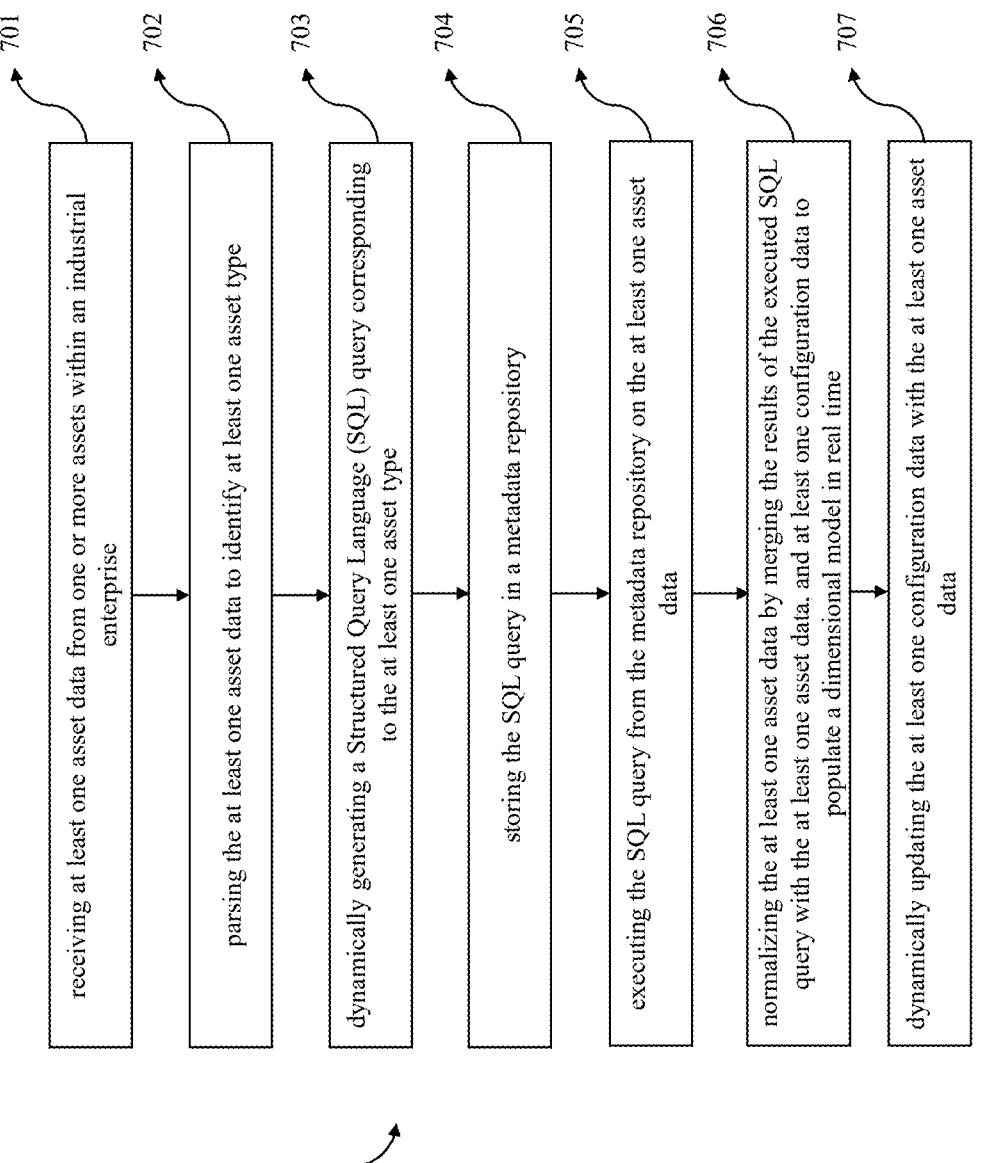

701 receiving at least one asset data from one or more assets within an industrial enterprise

702 parsing the at least one asset data to identify at least one asset type

703 dynamically generating a Structured Query Language (SQL) query corresponding to the at least one asset type

704 storing the SQL query in a metadata repository

705 executing the SQL query from the metadata repository on the at least one asset data

706 normalizing the at least one asset data by merging the results of the executed SQL query with the at least one asset data, and at least one configuration data to populate a dimensional model in real time

707 dynamically updating the at least one configuration data with the at least one asset data

METHOD AND A SYSTEM FOR NORMALIZING DATA IN DATA PROCESSING PIPELINES

TECHNICAL FIELD

Embodiments of the present disclosure generally relate to processing data related to assets in a business enterprise. Particularly, the present disclosure relates to a method and system for normalizing data related to assets in data processing pipelines.

BACKGROUND

In data warehousing applications, enterprise data from multiple heterogenous sources are collected, stored and organized into a single data repository. The data emanating from multiple data sources may be structured, semi-structured or unstructured and may be in a format different from what is needed in a target data repository. Typically, data-driven business organizations store and handle large amounts of data, which are analyzed in real-time for better decision making and enhanced customer experience. The data that is organized into the unified data repository aids in querying, analysis and enables informed business decisions. A business environment, for example, may generally include physical assets such as sensors, manufacturing equipments, factory equipment, one or more conveyor belts, one or more vehicle components, one or more hearing, ventilation and air conditioning (HVAC) components, machines, computing devices, and various other types of assets. Such assets collect and generate different types of data related to processes within a business environment. An enterprise typically manages large amounts of asset data across several sites, buildings and locations. The data thus obtained from such processes may be output in a raw streaming format. This data from multiple disparate data sources needs to be formatted and stored in a unified data repository to facilitate business intelligence (BI). Some functions of BI technologies include reporting, online analytical processing (OLAP), analytics, data mining, business performance management, text mining, and predictive analytics. One goal of BI is for example, to support better business decision-making. Therefore, tools for BI enable, among other things, dynamic querying of real-time data and historical data.

In many BI applications, data processing pipelines play an important role in cleansing the data before ingesting into the target data repository. The data processing pipelines are essential in managing and transforming data as they move from the source to the target data repository. BI tools such as the ETL (Extract, Transform, Load) and ELT (Extract, Load, Transform) are the most common types of data processing pipelines. The data processing pipelines can be used a beneficial tool in the creation and management of efficient and consistent databases, data marts and data warehouses. For example, in any business organization, metrics are collected to assess performance. The process involves raw data collection, aggregation, analysis, presentation and tracking actual performance metrics against target metrics. ETL tools are used for extracting raw data from the source, cleansing the data to remove anomalies and formatting the data to make it suitable for business analytics.

Current data warehouse architectures commonly utilize ETL or ELT processes. The choice of the pipelines depends on the nature of data, data processing constraints and the goals of the business organization. Typically, the ETL tools extract the data in raw format, transform the extracted data based on business needs and load the transformed data into the target system. Transformation or normalization of data, is one of the important phases in the data processing pipelines as normalizing the data ensures enhanced consistency and quality of data, providing business enterprises with actionable insights.

Conventionally, the data processing pipelines are hard coded in many BI applications. The hardcoded pipelines perform data normalization and load operations by means of custom code or logic which may be specific to a user or enterprise. Hardcoded pipelines are thus less flexible for modifications, particularly when there is a new data source or there is a change in data normalization or loading requirements. Therefore, when data from a new source is processed, hardcoded pipelines may tend to become inefficient. Also, the code needs to be to modified or rewritten and tested to adapt to the change in processing requirements thereby resulting in maintenance issues.

The prior art technologies fail to provide a configurable and an integrated data processing pipeline that not only enhances the operational efficiency of the data pipeline but also enriches the data for business intelligence.

Applicant has identified many technical challenges and difficulties associated with current solutions and through applied effort, ingenuity, and innovation, the applicant has provided a solution to the above-mentioned drawbacks.

SUMMARY OF THE INVENTION

In general, embodiments of the present disclosure herein provide a method for normalizing data related to assets in data processing pipelines. Other implementations will be, or will become, apparent to one with skill in the art upon examination of the following FIGURES and detailed description. It is intended that all such additional implementations be included within this description be within the scope of the disclosure and be protected within the scope of the following claims.

In one embodiment, the present disclosure provides a method for processing data related to assets in an enterprise. The method comprises receiving at least one data from one or more assets within an business enterprise, parsing the at least one data to identify at least one asset type. The method further comprises dynamically generating a structured query language (SQL) query corresponding to the at least one asset type and storing the SQL query in a metadata repository. The method further comprises executing the SQL query from the metadata repository on the at least one data, normalizing the at least one data by merging the results of the executed SQL query with the at least one data, and at least one configuration data to populate a dimensional model in real time, wherein the at least one configuration data comprises metadata associated with the one or more assets and an ontology model representing at least one of attributes, characteristics and relationships associated with the one or more assets. The method further comprises dynamically updating the at least one configuration data with the normalized data.

In another embodiment, the present disclosure provides a data processing system configured to process data related to assets in an enterprise. The data processing system comprises, a processor, a memory storing program instructions which, when executed by the processor, causes the processor to receive at least one data from one or more assets within an business enterprise and parse the at least one data to identify at least one asset type. The system is further configured to dynamically generate a SQL query corresponding to the at least one asset type and store the SQL query in a metadata repository. The system is further configured to execute the SQL query from the metadata repository on the at least one data and normalize the at least one data by merging the results of the executed SQL query with at least one configuration data to populate a dimensional model in real time, wherein the at least one configuration data comprises metadata associated with the one or more assets and an ontology model representing at least one of attributes, characteristics and relationships associated with the one or more assets. The system is further configured to dynamically update the at least one configuration data with the normalized data.

In yet another embodiment, the present disclosure provides a computer program product comprising at least one non-transitory computer-readable storage medium having computer-readable program code portions stored therein executed by a processor, the computer-readable medium when executed, is configured to receive at least one data from one or more assets within an enterprise, parse the at least one data to identify at least one asset type. The program executed by the processor is further configured to dynamically generate a structured query language (SQL) query corresponding to the at least one asset type and store the SQL query in a metadata repository. The program executed by the processor is further configured to execute the SQL query from the metadata repository on the at least one data and normalize the at least one data by merging the results of the executed SQL query with the at least one data, and at least one configuration data to populate a dimensional model in real time, wherein the at least one configuration data comprises metadata associated with the one or more assets and an ontology model representing at least one of attributes, characteristics and relationships associated with the one or more assets. The program executed by the processor is further configured to dynamically update the at least one configuration data with the normalized data.

The above summary is provided merely for the purpose of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

Figure 1:
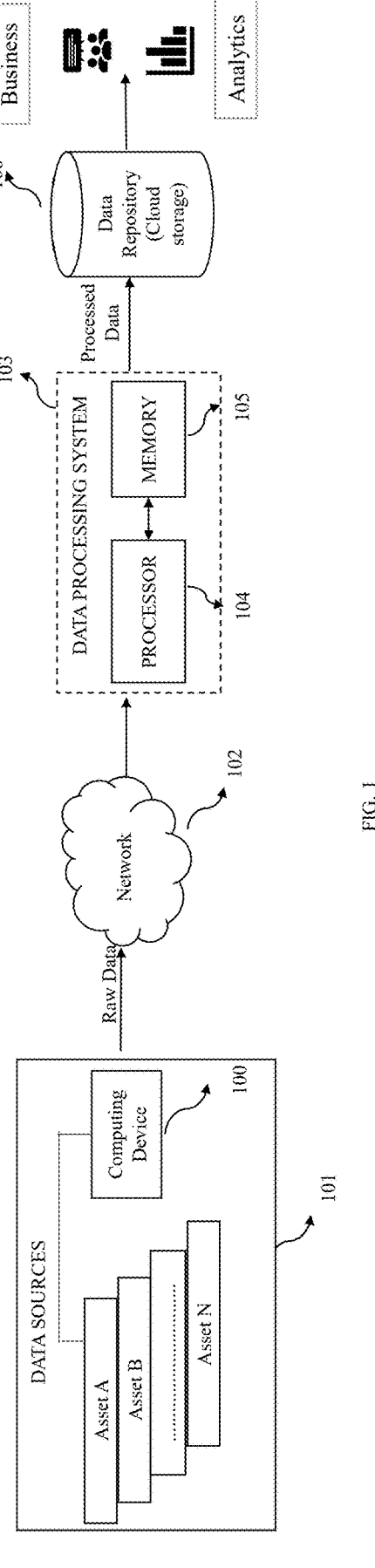
Figure 2:
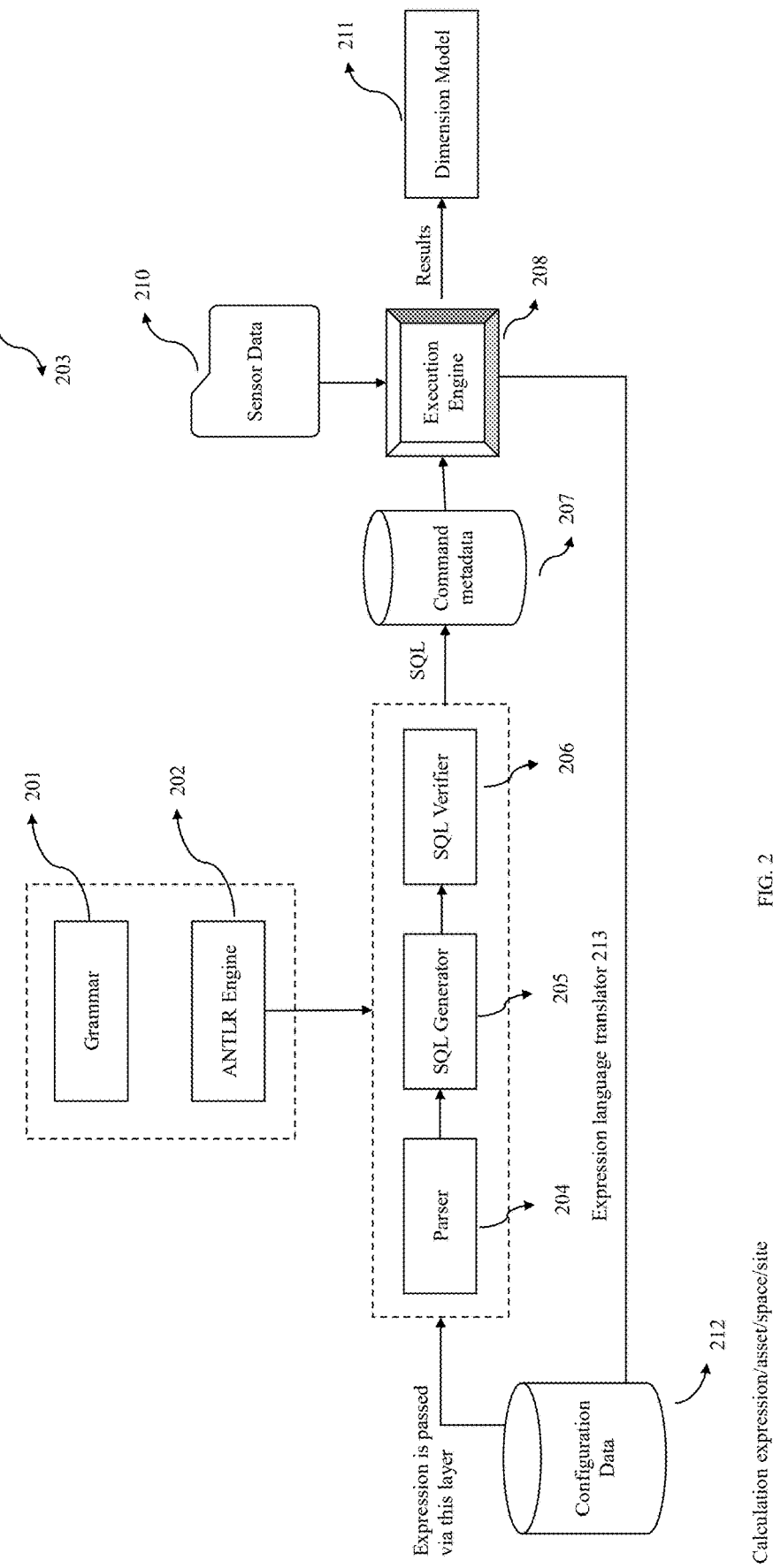
Figure 3:
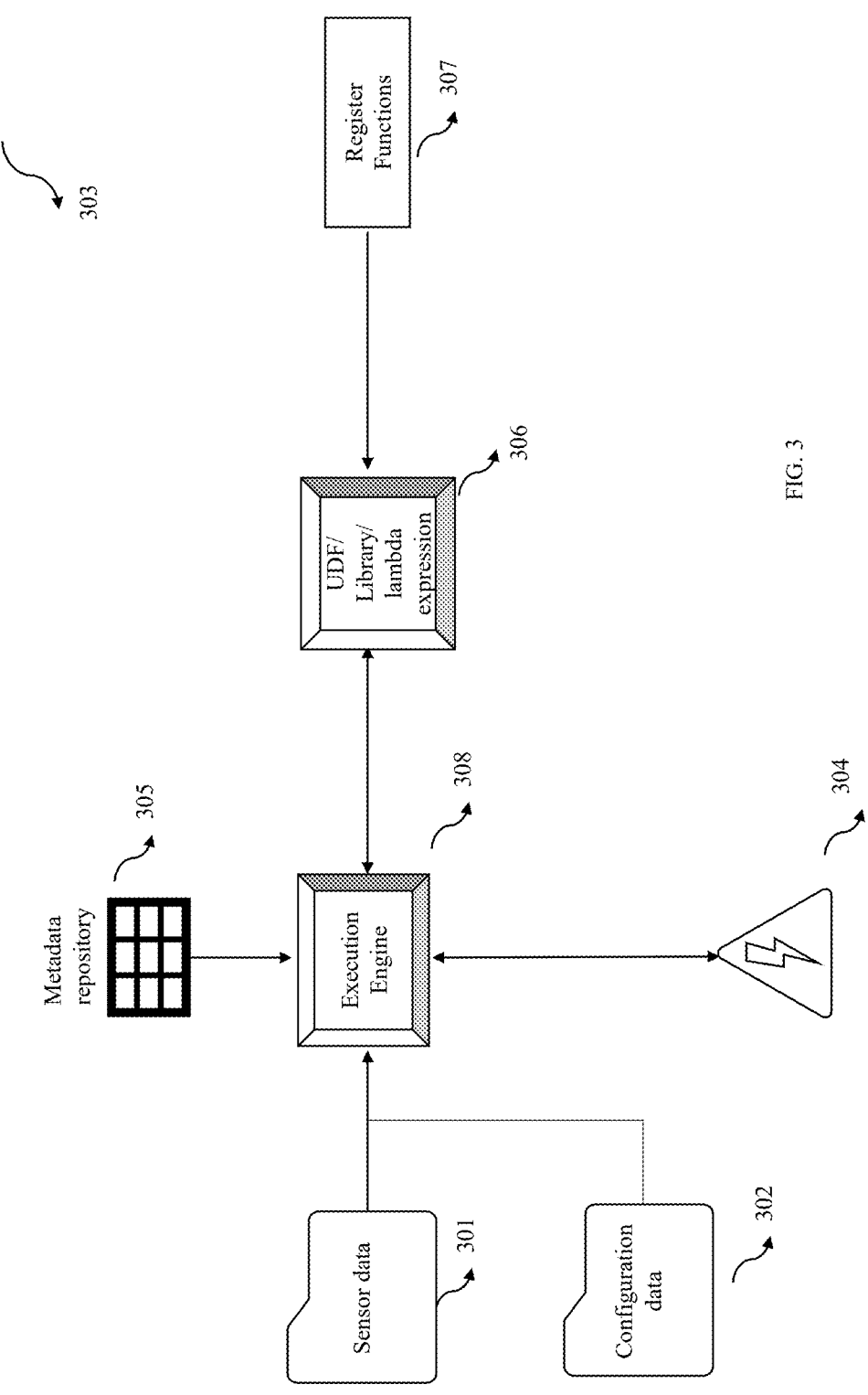
Figure 4:
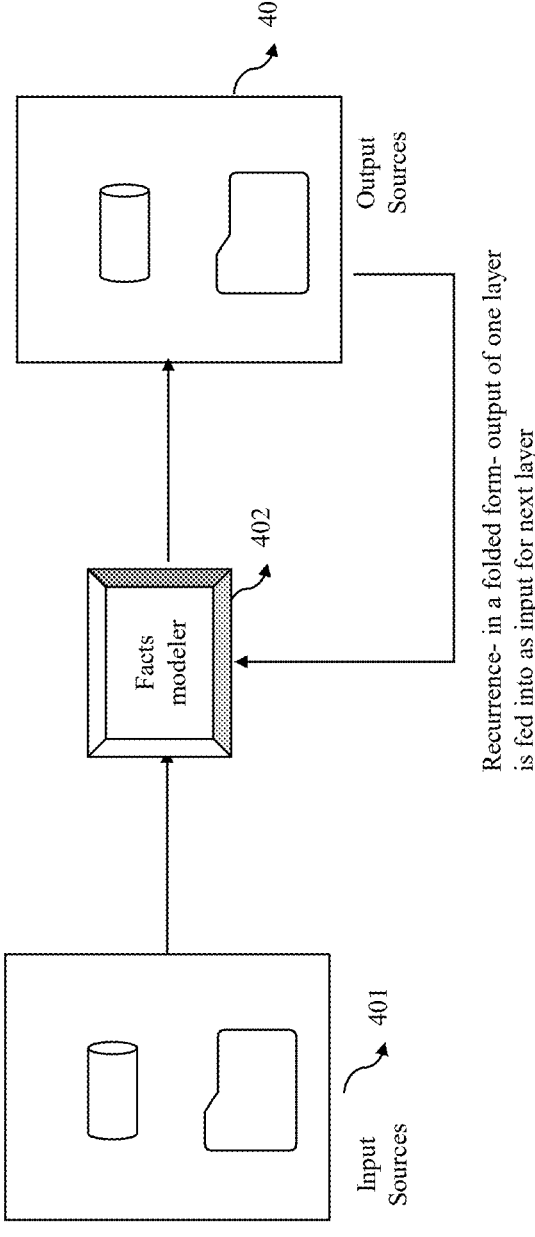
Figure 5:
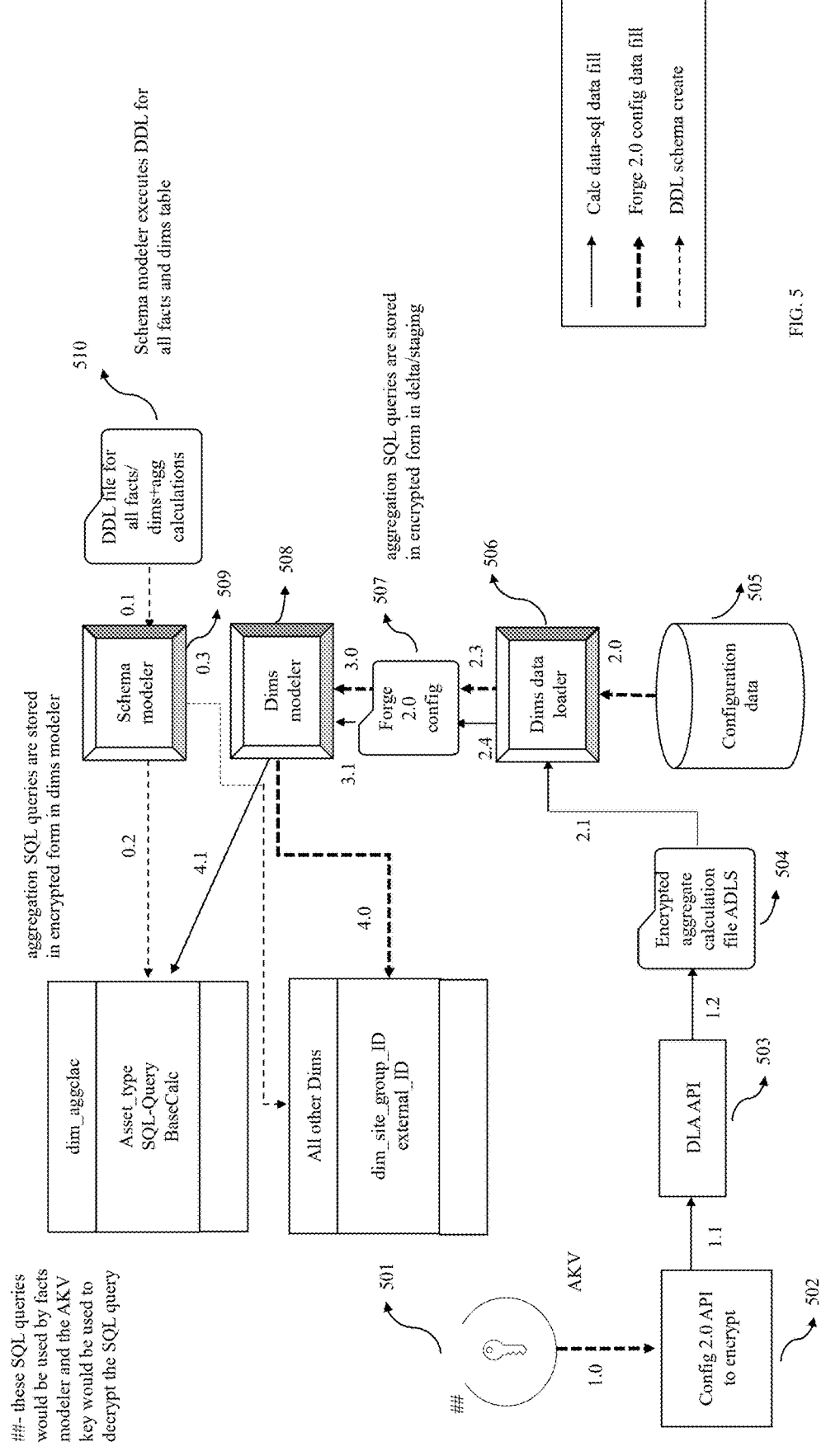
Figure 6:
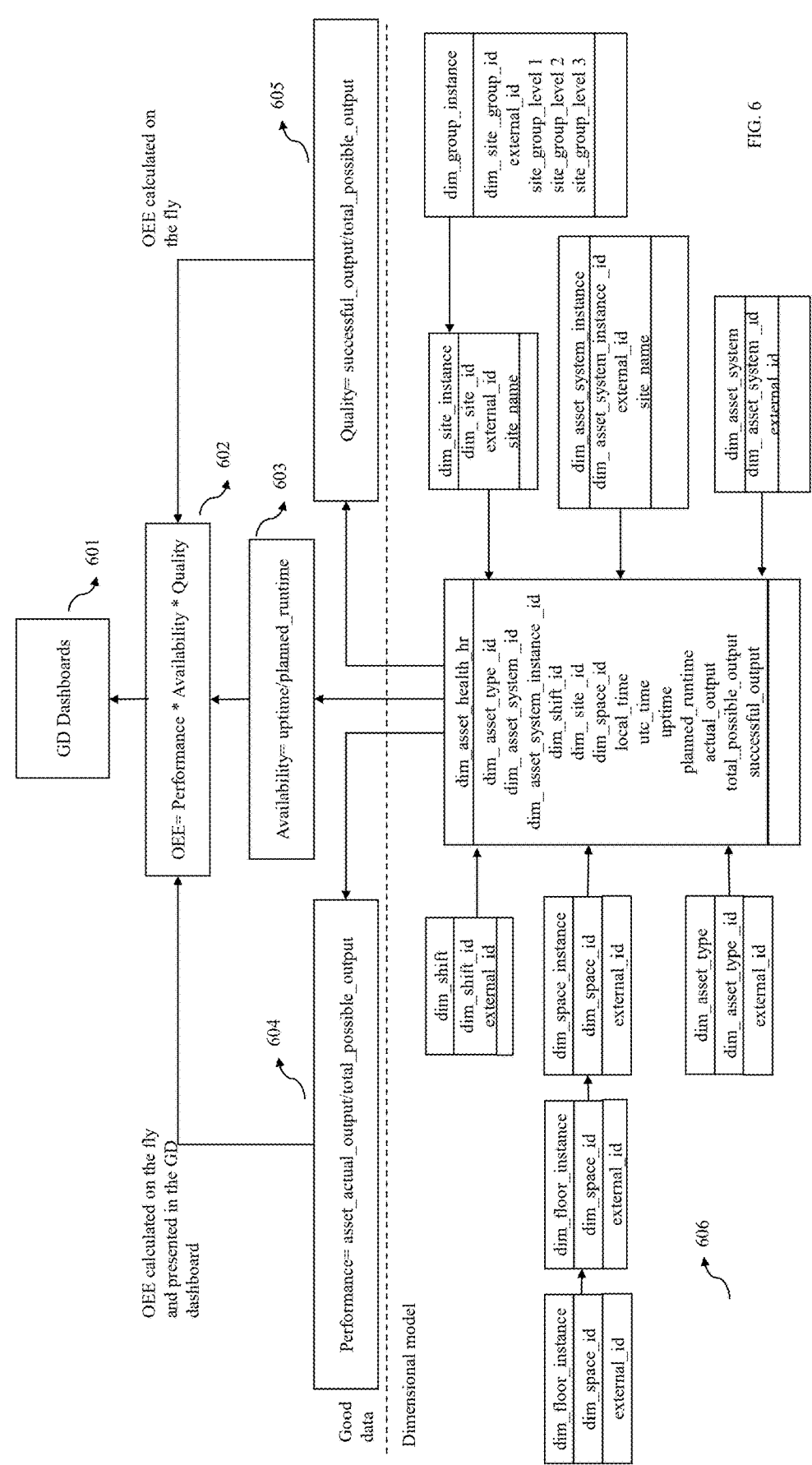

Having thus described the embodiments of the disclosure in general terms, reference now will be made to the accompanying drawings, which are not necessarily drawn to scale, and wherein:

FIG. 1 illustrates an exemplary block diagram of an environment, in which embodiments of the present disclosure may operate;

FIG. 2 illustrates an exemplary block diagram of a data processing system in accordance with one or more embodiments described herein;

FIG. 3 illustrates another exemplary block diagram of a data processing system in accordance with one or more embodiments described herein;

FIG. 4 is an exemplary block diagram of a framework of a recursive data flow in a data processing pipeline in accordance with one or more embodiments described herein;

FIG. 5 illustrates an exemplary block diagram of a framework to populate data normalization calculations into a dimensional model in accordance with one or more embodiments described herein;

FIG. 6 illustrates an exemplary process of performing data normalization calculations of a sample asset in accordance with one or more embodiments described herein;

FIG. 7 illustrates a flow diagram of a method for processing data related to assets in accordance with one or more embodiments described herein;

DETAILED DESCRIPTION

Some embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

Generally, a business environment may include physical assets such as sensors, manufacturing equipment, factory equipment, one or more conveyer belts, one or more vehicle components, one or more HVAC components, machines, computing devices, and various other types of assets. Such assets are configured to generate various types of data related to business processes. For example, the assets may gather operational data from machinery and monitor key aspects of business environment. Sensors, for example may be configured to capture various types of data associated with a premises, building, site, manufacturing plant or process, and the like. The data thus obtained from such processes may be output in a raw streaming format or at desired time intervals.

Data-driven business enterprises rely on the use of large volume of data and different types of data for business operation and insights. For example, every enterprise typically creates its own customized data warehouse or logical data structure that is unique or specific to their organizational needs using well-known relational database management systems (RDBMS). The users or customers of the enterprise (on-premise or in the cloud) may add or use new custom fields in source systems and may want to use the custom fields for reporting metrics in their data warehouse. In such cases, the ETL framework and the reporting workflow needs to be modified. As source systems and data warehouses move to the cloud, it would be challenging to add new fields and customize and redeploy the data model, ETL framework, and reporting workflows in the cloud.

To manage the ecosystem for a business enterprise, critical data is collected and aggregated from diverse business applications before storing into a single data repository for various consumers. The data processing pipelines play an important role in online analytical processing (OLAP) by organizing and analyzing the data related to the one or more business processes. OLAP describes technologies that can extract and present data for analytics. Analytics aid enterprises to understand the various activities of their business which may include performing contextual analysis, performance management, forecasting, Key Performance Indicators (KPIs) and trends analysis, dash-boarding, and the like. For example, OLAP databases can be used to identify sales trends, analyze marketing campaigns, and forecast financial performance. The process involves evaluating analytical queries against millions of records of data. For example, sales data can be analyzed in terms of dimensions such as time, geographical region, department, and individual products.

The data processing pipelines such as an ETL pipeline aid in normalizing the raw streaming data based on business needs before loading into the unified target repository. As large amounts of data may be received from different enterprises and/or assets, the data normalizing requirements vary from asset to asset based on the business requirements of the particular industry. For example, each incoming input data to the data processing pipeline may have unique data properties, characteristics and attributes depending upon the asset and/or asset type. While some data formats may be structured, some other data formats may provide semi-structured or unstructured data schemas. Since data formats may vary when processing large amounts of data from heterogeneous sources, normalization of data from one format to the other format becomes a complex task. For instance, the differences between a source data schema and a target data schema may need to be identified in order to determine the normalization rules that need to be applied to the source data. In such cases, generation of custom normalization workflow may be required based on the differing business requirements of the enterprise. This increases the development costs and impacts the efficiency of processing data. As new data formats keep evolving, the processing pipelines need to be updated in order to generate new transformation workflows involving new data formats. Therefore, the data processing pipeline needs to be managed effectively to accommodate varying requirements for each asset and/or enterprise.

Accordingly, in order to normalize data effectively, there are three considerations, firstly, it is essential to identify various engineering units for different assets and decide the engineering unit that needs to be targeted for the normalization process. Secondly, it is also essential to identify various normalization calculations from source engineering units to target engineering unit for every asset and thirdly, execute the normalization calculations in the normalization stage to improve the efficiency of the data pipeline.

Typically, the traditional data pipelines are hardcoded. For example, in many use cases of extensible business intelligence (BI) applications, the normalization calculations are hardcoded. Therefore, when the incoming data is processed by the data processing pipeline, the hardcoded calculations are executed and the aggregate results are stored. However, when data from a new source is received, the pipeline needs to be modified or re-written with new code or logic to adapt to the changing user requirements, making the pipeline inflexible and having limited functionality and usability. For example, extensible data types are complex, dynamic and heterogenous. The data processing pipelines in such cases need to be re-configured for every new customer or user.

Therefore, there is a need to provide a configurable and extensible data processing framework that is flexible and is adaptable to evolving data structures and business requirements, making it easy to add new data sources/data formats and providing seamless integration. A configurable data pipeline may prove to be efficient and useful in normalizing large volumes of data when compared to hardcoded pipelines, as they provide improved scalability, reusability and ease of maintenance.

There is also a need to provide an integrated and comprehensive data processing framework that eliminates the need to re-write or reconfigure the processing pipelines with new transformation rules and calculations for every new tenant and domain, rather provide a framework that will be useable by multiple tenants or user groups, enabling simplification of the data ingestion pipeline and data management.

There is yet another need to provide a data processing pipeline that enables businesses to rapidly redesign and configure workflows for efficient data migration, robust data handling and legacy system integration.

Accordingly, the present disclosure provides a method, system and computer program product for dynamically normalizing data in data processing pipelines before data ingestion into a unified target repository.

FIG. 1 illustrates an exemplary block diagram of an environment, in which the embodiments of the present disclosure may operate. Specifically, FIG. 1 illustrates one or computing devices 100. In some embodiments, one or computing devices 100 may be associated with one or more data sources 101. The one or more data sources 101 in some embodiments, may include one or more assets, Asset A, Asset B . . . Asset N related to one or more business enterprises. In some embodiments, the one or more assets may be associated with any entity or facility including but not limited to companies, buildings, manufacturing plants, warehouses, real estate facilities, laboratories, aircraft, spacecraft, automobiles, vehicles, sites, premises, or any other type of entity in a business environment. In some embodiments, one or more computing devices 100 and the one or more data sources 101 and/or assets may be associated with a tenant or user group and/or domain. The tenant may own one or more data sources 101 and/or assets.

According to various embodiments, a network 102 is configured to provide communication between various components depicted in FIG. 1. In some embodiments, the network 102 includes a public network (e.g., the Internet), (e.g., an internal localized, or closed-off network between particular devices). In some other embodiments, the network 102 may be a hybrid network (e.g., a network enabling internal communications between particular connected devices and external communications with other devices). Such configuration(s) include, without limitation, a wired or wireless Personal Area Network (PAN), a Cloud network, Local Area Network (LAN), Metropolitan Area Network (MAN), Wide Area Network (WAN), and/or the like. In various embodiments, the network 102 may include one or more base station(s), relay(s), router(s), switch(es), routing station(s), and/or the like.

In some embodiments, the one or more computing devices 100 is configured via hardware, software, firmware, and/or a combination thereof to receive one or more types of data associated with one or more assets. In various embodiments, one or more computing devices 100 is configured to receive operational data in relation to one or more assets. In some embodiments, the one or more computing devices 100 may receive operational data from one or more sensors associated with one or more assets or data sources 101. The operational data may comprise sensor data or any other data describing operation of the one or more assets. In one or more embodiments, the operational data may define the type of sensors associated with an asset and the type of data that is being sensed by each sensor. For example, the sensor data received from one or more computing devices 100 may comprise data received from one or more heat sensors, gas sensors, humidity sensors, pressure sensors, temperature sensors, and the like. In one example, the sensors may monitor the operation of a residential or commercial building or enterprise (e.g., security systems, building automation systems, and the like). In another example, the sensors may monitor the operation of a manufacturing plant (e.g., manufacturing machinery, conveyor belts, and the like). In another example, the sensors may control or monitor the operation of a vehicle. In some embodiments, the data in relation to assets may be called asset data.

Typically, a given enterprise may manage operations of various assets (e.g., possibly thousands) across several sites and locations. Management of such systems often includes monitoring the operations of the assets and controlling the assets to optimize the performance of the assets and accomplish specific business objectives of the enterprise. For example, managing the operations of the assets may include aggregating contextual data defining various attributes such as relationships, types, locations associated with the assets. This aggregated context data may be collected and stored to provide actionable insights for management of various assets of the business enterprise.

According to various embodiments, one or more sensors may monitor one or more operational and performance metrics of the assets. In some embodiments, the sensors may be located remotely or in proximity of the assets. The sensors may be utilized to collect data associated with an asset in real-time or at one or more pre-defined intervals (e.g., every 5 minutes, hourly, and the like). In one example, a temperature sensor may include real-time temperature data associated with one or more assets. For example, a thermostat may monitor the temperature of a building environment to control the functions of an installed HVAC system in order to maintain a set temperature within the building environment. Humidity sensors, for example may capture the amount of water vapor in a particular system. Pressure sensors, for example may detect the fluctuations or drops in pressure for systems that include gases and liquids.

In one embodiment, a data processing system 103 of FIG. 1 may receive data from one or more computing devices 100 in relation to one or more assets through the network 102. In one or more embodiments, the one or more computing devices 100 is integrated within or corresponds to a mobile computing device, a smartphone, a tablet computer, a mobile computer, a desktop computer, a laptop computer, a workstation computer, a wearable device, a virtual reality device, an augmented reality device, or another type of remote computing device.

The data received by the data processing system 103 from the one or more computing devices 100 may be in a raw streaming format in some embodiments. For example, many data-driven organizations within the business enterprise may process large volume of data which may be diverse in type and formats. The raw streaming data may include for example, data related to one or more business processes such as asset configuration data, asset identification data, sensor identification data, sensor data, site data, real-time data, worker data, operational data, fault data, work order data to name a few examples. In one or more embodiments, the sensor data includes real-time sensor data and historical sensor data. In one or more embodiments, the site data includes but not limited to specific site data for an asset infrastructure, event data for an asset infrastructure, process data for an asset infrastructure, operational data for an asset infrastructure, fault data for an asset infrastructure. In certain embodiments, the one or more computing devices 100 incorporates encryption capabilities to facilitate encryption of one or more portions of the received asset data.

According to some embodiments, the raw streaming data from the one or more computing devices 100 needs to be processed to render them useful and conform to the format of the target data repository 106 for actionable insights. In some embodiments, the target data repository 106 may be one or more databases or data lakes or data warehouses based on the business requirements of the enterprise. In certain embodiments, the database or data lake may be a time series database which can be configured to store one or more portions of raw streaming data and formatted asset data.

According to various embodiments, the data processing system 103 may include a processor 104 and a memory 105 for storing and executing instructions to facilitate processing of the raw data. For example, the raw data is extracted and transformed by the data processing system 103 to remove anomalies, duplicates, errors before ingestion into a target cloud repository 106 for storage, reporting, analysis and decision making. Such data can be used by enterprises for performing business related operations, such as data mining, OLAP, and decision support. Accordingly, in one or more embodiments, the data processing system 103 may include one or more software modules or components to facilitate data processing in accordance with the one or more embodiments of the present disclosure.

The memory 105 may be non-transitory and may include, for example, one or more volatile and/or non-volatile memories. In some embodiments, the memory 105 includes or embodies an electronic storage device (e.g., a computer readable storage medium). In some embodiments, the memory 105 is configured to store information, data, content, applications, instructions, or the like, for enabling a system to carry out various operations and/or functions in accordance with example embodiments of the present disclosure.

In an embodiment, one or more modules (not shown) of the data processing system 103 may be implemented using electronic hardware, computer software, or any combination thereof. Whether such elements are implemented as hardware or software depends upon the application and design constraints imposed on the overall system. Examples of the systems may include computing systems (e.g., servers, datacenters, desktop computers, Internet of Things devices, etc.) and mobile computing systems (e.g., laptops, cell phones, etc.). Although components are described with respect to functional limitations, it should be understood that the particular implementations necessarily include the use of particular computing hardware. It should also be understood that in some embodiments certain of the components described herein include similar or common hardware.

In one preferred embodiment, the data processing system 103 of the present disclosure may be configured as a cloud-based system.

The data processing system 103, in one or more embodiments is a data processing pipeline, in accordance with the embodiments of the present disclosure which is described in greater detail in FIG. 2.

FIG. 2 illustrates a data processing system 203 that is one embodiment of data processing system 103 of FIG. 1. In an embodiment, the data processing system 203 is a data processing pipeline which comprises one or more modules for extracting and normalizing data received from one or more assets (e.g. sensor data 210) from one or more enterprises. In one implementation, the data processing pipeline is an Extract, Transform, Load (ETL) process where the raw data is extracted from source systems, transformed before loading into a target repository. As the data is in its original form, it has to be transformed or normalized and mapped to prepare for the target data repository. In the transformation phase, the ETL validates, authenticates, deduplicates, aggregates the data to enable data querying. In another implementation, the data processing pipeline is an Extract, Load, transform (ELT) process where the raw data is extracted and loaded into the target system, where the data transformation takes place. ETL and ELT are types of data integration pipelines which cleanses the raw data from the one or more assets, normalizes the data by applying business rules and calculations and integrates the data for accuracy and consistency with the target data repository.

In an embodiment, the data processing system 203 receives data from one or more computing devices 100 (of FIG. 1) associated with one or more assets from one or more enterprises. In some embodiments, the data may be received from one or more sensors associated with one or more assets operating within a business environment. The sensor data (e.g. sensor data 210) may be received in streaming formats or at pre-defined intervals, according to various embodiments herein. In another example, worker data may include calculations around worker idle time and work order data may include calculations around how many work orders are created. In another example, fault data may be count of faults based on severity, etc.

Typically, large amounts of such data may be received from different enterprises and/or assets, and the data normalization requirements vary from asset to asset based on the business requirements of the particular industry. For example, each incoming input data to the data processing pipeline may have unique data properties, characteristics and attributes depending upon the asset and/or asset type. Therefore, the data processing pipeline needs to be managed effectively to accommodate varying requirements for each asset and/or enterprise.

Accordingly, in some embodiments, the data processing pipeline is configured to perform asset-specific calculations for normalization "on-demand" or during query time. In some embodiments, normalizing the data may include defining the granularity of fact tables, dimension tables and a schema of the target data repository (e.g. data warehouse), where the normalized data is to be loaded. The schema of a data warehouse defines a data model for storing data representing measures and dimensions pertaining to a business organization. The fact tables store numerical data and metrics of an enterprise in a data warehouse, and dimension tables contain descriptive information and attributes relating to numerical data stored in fact tables. For example, fact records (e.g., sales data) storing the metrics, are stored separately from dimension records (e.g., time data, geographic data, department data, product data) storing the dimensions or context information. In addition, there are defined relationships between fact tables and dimension tables.

To this end, the data processing system 203, according to various embodiments, may provide asset-specific configuration by defining one or more operations, calculations, and/or normalization rules that need to be applied to the input data of different engineering units. The normalization calculations of the engineering units may vary and that could affect aggregate calculations such as average, sum and the like. Consider an example of a reading of the acceleration-_axis as 0.0184 inches/sec and another example as 2 cm/second, if average is calculated by performing (0.0184+2)/2, it does not result in a correct engineering unit either in inches/sec or cm/second. Therefore, normalization is necessary to be performed at the normalization phase in order to ensure that calculations is performed accurately.

In some embodiments, such asset specific calculations may be defined in the form of configuration data 212 stored in a metadata store (e.g. data about data) such as PostgreSQL. PostgreSQL is a known database management system typically used in data warehousing applications and suited for handling diverse data types and allows defining custom data types, functions and aggregates. In certain embodiments, the configuration data 212 may describe metadata regarding assets and asset types (e.g. sites, buildings, entities) in relation to one or more business enterprises. In certain embodiments, the configuration data 212 may describe parameters, characteristics, attributes, and relationships associated with the one or more assets forming a knowledge domain. In one example, the knowledge domain may be represented as an ontology model providing information regarding the characteristics of data emanating from multiple assets. The ontology model may provide a representation of the one or more assets, classification of the assets into different types, definition of various attributes of the assets and definition of associations/relationships between the various assets and categories.

In some embodiments, the configuration data 212 may include metadata such as identification information (e.g. an identification that uniquely identifies the asset) for individual assets of the enterprise, type information of the individual assets (e.g. the type of sensor such as a temperature sensor), properties associated with the identification information and/or the type information, locations of the assets (e.g. where exactly the asset is located) within the enterprise. The configuration data 212 may also define relationships between the assets with respect to each other, relationships between types of the assets with respect to each other, and/or roles of the assets and/or types of assets. The configuration data 212 may thus provide domain-specific awareness in relation to one or more assets and asset types.

In one or more embodiments, the configuration data 212 may be embodied in a domain specific language (DSL) in the metadata data store, PostgreSQL. In some embodiments, the configuration data may be defined in the form of domain specific expressions, calculations and transformation rules as discussed supra. For example, the configuration data 212 may be able to determine configurations like frequency of execution of the data processing pipeline, grain of the aggregate and the ability to provide the normalization calculations in a safe and secure manner.

In one implementation, the data processing pipeline may be able to provide a configuration that may determine the frequency of execution of data processing depending on the requirements of the specific asset and the business needs. In one implementation, the data normalization process may be required to run at specific time intervals or on a scheduled basis (e.g. batch processing) wherein the normalizations are applied to the entire dataset. Therefore, the frequency of execution of the normalization process in batch processing may be low. In some other implementation, the normalization rules may be required to be applied continuously or near-real-time as data streams in (e.g. stream processing). The frequency of execution of the normalization process in stream processing may be high and may happen as and when data is generated and received.

In one other implementation, the data processing pipeline may be able to provide a configuration that may determine the grain of the aggregate or the level of detail or granularity at which data is aggregated for a specific asset. For example, if a sales dataset is considered, the grain of the aggregate may be detailed in the form of individual transaction records and may include details such as product sold, the quantity, details of customer and date of the transaction. In another example, the grain of the aggregate may be at a higher level and may provide a summarized data, e.g. daily sales or monthly sales of each product. Typically, the grain of the aggregate should align with the business requirements of the enterprise and/or asset.

In yet another implementation, the data processing pipeline may be able to provide the normalization calculations in a safe and secure manner. Cloud computing environments, for instance may provide challenges when data is migrated to a cloud database management system from an on-premises computing system. For example, sensitive columns of the dimensional model may be encrypted before being stored in the cloud resource. In another example, encrypting data during the extraction process and decrypting the data during loading process.

In an embodiment, the data processing system 203 comprises an expression language translator 213 for interpreting the context of the input asset data received from one or more computing devices 100 (FIG. 1). In some embodiments, the expression language translator 213 interprets the input data which may be in a DSL, and enables dynamic conversion of the DSL into a SQL (structured Query language) query to be executed on the input asset data. To this end, the data processing system 203 in certain embodiments, may create domain specific grammar rules 201 for the configuration data 212 using a parsing tool ANTLR (ANother Tool for Language Recognition) engine 202 or any known parsing tool. In some embodiments, the calculations, rules and expressions in the configuration data 212 is defined by the grammar rules 201.

In some embodiments, the expression language translator 213 comprises a parser 204 which parses the input asset data to identify the type of one or more assets. In some embodiments, the expression language translator 212 comprises an SQL generator 205 for dynamically generating a SQL query corresponding to the identified asset type. As is known in the art, SQL is a language used for interactively querying, managing and manipulating relational databases or can be embedded within a programming language to interface with the database.

In some embodiments, the parser 204 may have the ability to parse the input asset data received from one or more computing devices 100 by analyzing whether the data conforms to the rules of the grammar 201. In some embodiments, the SQL generator 205 may generate a SQL query based on the parsed data. In some embodiments, the expression language translator comprises a SQL verifier 206 which may validate the SQL query that has been generated by the SQL generator 205. In some embodiments, the SQL verifier 206 validates the query by checking the syntax and semantics of the query. For example, the syntax of the SQL query is verified by the parser based on pre-defined grammar rules. The semantics of the SQL query is verified by checking whether the elements of the query match with a schema of a target repository, where the normalized data is to be loaded.

Accordingly, in one or more embodiments, the expression language translator 213 may be configured to dynamically generate a SQL query corresponding to the asset type that has been identified as a result of the parsed asset data. The SQL query is further stored in a metadata repository, 207 in certain embodiments. In some embodiments, an execution engine, 208 procures the SQL query from the metadata repository 207 and executes the query on the input asset data. The input asset data is normalized by merging the results of the executed SQL query with the input asset data and the configuration data 212 to form facts for the fact table, which is then persisted in the dimensional model, 211, in real time.

Embodiments of the present disclosure thus provides a framework for normalizing data by configuring the data ingestion pipeline to perform calculations and transformations during query time instead of being pre-calculated and which is useable by multiple tenants or user groups, enabling simplification of the data ingestion pipeline and data management In one or more embodiments, the normalized asset data can provide information on the business assets and corresponding sensors, the engineering units associated with one or more assets, the measurement values captured by the assets and sensors, and the like. For example, employing one or more techniques disclosed herein can improve the quality of the different types of business data stored in one or more data stores or data lakes associated with a particular business environment by utilizing the dynamic normalization techniques disclosed herein. Also, the amount of time required for normalizing raw streaming data generated by one or more assets can be reduced and efficiency of the data pipeline can be improved. Moreover, normalizing the raw streaming data helps in specific data querying which in turn can reduce the usage of computational resources.

In one embodiment, the normalized asset data has wide range of applications and enables querying that include, but not limited to, data queries regarding the identifying information of assets and corresponding sensors, the locality of the assets and corresponding sensor points, the control functions of the assets and sensor points, the engineering units associated with one or more assets, the measurement values captured by the assets and sensor points, and the like.

In some embodiments, the normalized asset data can be used to dynamically update the existing ontology model associated with a particular business environment. In some embodiments, the data processing system is configured to reconfigure asset data objects, based on the changes to the asset data after normalization. As a result, the data processing system can precisely normalize the raw streaming data with the most current configuration of asset data objects.

According to an embodiment, data lineage may be produced from the ETL process by providing a platform where the sources of input, output and transforms including data/tables are traced. The ETL process can generate the metadata of itself and persist in the metadata store, PostgreSQL. A subsequent pipeline which is daisy chained into the set of pipelines may also produce metadata that is persisted in the metadata store. This metadata store can then be used to generate the data lineage and presented in a graphical form for future business analytics. The techniques discussed herein thus enable capturing and maintaining accurate data lineage.

The various embodiments disclosed herein can reduce computational resources, and normalize the raw data into actionable intelligence, and deliver meaningful and useful business insights for analysis of the health, function, efficiency and output of the assets in a particular environment.

FIG. 3 illustrates another exemplary block diagram of a data processing system 303 in accordance with one or more embodiments described herein. In an embodiment, the data processing system 303 (203 of FIG. 2) is a data processing pipeline which comprises one or more modules for extracting and normalizing data received from one or more assets (e.g. sensor data 210) from one or more enterprises. In an embodiment, the data processing system 303 receives data from one or more computing devices 100 (of FIG. 1) associated with one or more assets from one or more enterprises. In various embodiments, one or more computing devices may be configured to receive operational data in relation to one or more assets. In some embodiments, the data in relation to assets may be called asset data.

In some embodiments, the one or more computing devices may receive data from one or more sensors associated with one or more assets. In some embodiments, the business environment may include physical assets such as sensors, manufacturing equipment, factory equipment, one or more conveyor belts, one or more vehicle components, one or more HVAC components, machines, computing devices, and various other types of assets. Such assets are configured to generate various types of data related to business processes. Sensors, for example may be configured to capture various types of data associated with a premises, building, site, manufacturing plant or the like.

In an embodiment, the data processing system 303 may be configured to process asset data using complex normalization rules, calculations and expressions. According to some embodiments, normalization calculations may be configured as a user defined function, UDF 306. In one implementation, by registering 307 the UDF 306 in the configuration platform, the execution engine 308 of the data processing pipeline may be configured to execute the UDF 306 for data normalization. UDFs 306 allow for defining user specific functions for data manipulation and may be useful for complex normalization calculations. For example, if a specific business rule or calculation is to be applied to a particular dataset during normalization phase, the logic for the calculations can be encapsulated in a UDF 306. UDFs 306 aid in reusing normalization logic across the data pipelines and provides flexibility in complex data processing.

In another implementation, the normalization calculations may be defined as a library or lambda expression 306. For example, by registering 307 the library or lambda expression in the configuration platform, the execution engine 308 may be configured to execute the library or lambda expression for data normalization. Libraries provide pre-built functions and utilities which can be leveraged for quick and seamless data extraction and normalization. Lambda expressions are anonymous functions which are invoked by the execution engine 308 for filtering and cleaning data during normalization.

In yet another implementation, the normalization calculations may be defined in the form of azure functions 304. For example, the customers may have their own azure functions 304, which may be executed by the execution engine 308 and the inputs and outputs to the azure function may be defined via the configuration platform. Azure functions are commonly used in data processing applications and have the ability to seamlessly integrate with various Application Program Interface (APIs) to extract data and perform complex data normalizations including aggregations, joins and data type conversions.

As illustrated in FIG. 2, in some embodiments, the metadata repository 305 (207 of FIG. 2) stores information regarding the SQL query formed as a result of the DSL to SQL conversion. According to various embodiments, the execution engine 308 of the data processing pipeline may be configured to execute any one of SQL query or UDF or library or lambda expression and/or azure functions during normalization phase. In some embodiments, the results of the executed SQL query may be merged with the input sensor data 301 and the configuration data 302 to obtain normalized asset data.

In some other embodiments, the results of the executed UDF or library or lambda expression may be merged with the input sensor data 301 and the configuration data 302 to obtain normalized asset data. In yet another embodiment, the results of the executed azure function may be merged with the input sensor data 301 and the configuration data 302 to obtain normalized asset data.

In some embodiments, the metadata repository 405 may have links to other SQLs to perform linked normalization calculations. In one implementation, the linked calculations may be executed and their results may be combined together. For example, linked commands may be executed when a very complex logic may not be possible to be implemented as a single SQL in a single pass. One example of such cascading calculation expression may be, "Sin(45)+Cos(45)". These functions may have to be cast into SQL first and then each part would have to be executed individually and their results may need to be combined. As there are two functions, Sin(45), Cos(45) and an operator '+', in the metadata repository, for type "SQL" there must be two entries (2 rows) that describes the functions individually and there must be an operator defined between the SQL commands.

In some embodiments, the SQL commands may need to be linked together. The process of linking is to establish the fact that the two or more SQL queries need to be executed and combined in different passes. For example, consider a function that has a lookahead and lookback link. For a given function, a lookahead link indicates that there is another function that has to be executed in order to fulfill the complete calculation. For the function that is the lookahead for the base function, when we have an entry in metadata repository 305 for lookahead function, base function should be marked as its lookback function. The execution engine 308 may be configured to interpret the function as "execute the lookahead function" in addition to the base function, also "do NOT execute the lookback function" linked from the lookahead function. The function where the lookahead is marked NULL is the leaf node and that must indicate termination of the function execution.

A sample of the metadata repository 305 which stores the SQL queries and functions during the normalization workflow is indicated below.

| ID | Asset_ name | Fact | Command_ type | Command | Lookahead | Lookback | Lookahead operator | Remarks |
|----|------------|------|---------------|---------|-----------|----------|--------------------|---------|
| 1234 | General_ conveyor | | Sql | select date_trunc ("hour", time) --- | 1237 | | + | This prompts the facts modeler (spark) execute sql. The lookahead_ operator indicates to the engine to reduce the results of the 2 sql's |
| 1235 | General_ conveyor | | udf | | NULL | NULL | | This prompts the facts modeler (spark) to execute a registered udf |
| 1236 | General_ conveyor | | azfn | | NULL | NULL | | This prompts the facts modeler (spark) to execute an azure function |
| 1237 | General_ conveyor | | sql | Select date_trunc ("hour", time) --- | NULL | 1234 | | This is the sql |

As can be seen from the above table, the metadata repository 305 stores the SQL queries or UDFs or azure functions are stored as commands which may be utilized by the execution engine 308 for normalization calculations. The objective of the framework is to be able to configure the normalization calculations as an SQL query or UDF or library or lambda expression, which may be procured by the execution engine 308 and executed on the input asset data for normalization. The metadata repository 305 contains information about each asset and facts related to the asset. For example, each asset may have a unique asset identifier and an asset name. For example, in case of an asset ID 1235 corresponding to the asset, general conveyer, the execution engine 308 is configured to execute the UDF 306 for normalization. Also shown is an example of lookahead and lookback functions for asset IDs 1234 and 1237, wherein the execution engine 308 is configured to perform linked calculations by combining two SQL queries. Yet another example is the asset general conveyer corresponding to asset ID 1236, where the execution engine is prompted to invoke and execute the azure function for normalization.

The metadata and normalized asset data obtained by the techniques disclosed herein may be collected, archived, and consulted in order to provide visibility into and perform various control operations with respect to the assets of the business enterprise. For example, the normalization techniques discussed herein may be useful for providing, for each enterprise, an enterprise-wide, top-to-bottom, historical and real-time, view of the status of various processes, assets, people, and other objects associated with all of the assets managed by the enterprise, which in turn can optimize the performance of the assets and the efficiency of the ETL pipeline.

FIG. 4 is an exemplary block diagram of a framework of a recursive data flow in a data processing pipeline in accordance with one or more embodiments described herein. In an embodiment, multiple functions and their inputs and outputs can be chained together, for example by creating a recursive dataflow. In an embodiment, the facts modeler 402, which is the execution engine 308 (FIG. 3) may perform the extract, transform and load (ETL) process on the input raw data 401 for data normalization. After the ETL is run once, the output data 403 of the executed process is fed as input to the facts_modeler 402 for the next process of ETL. In an embodiment, complex normalization calculations may be implemented as recursive functions which helps in appending data to the original dataset. In an embodiment, the original input data 401 is updated, by replacing the historical data with new data. In an embodiment, the recursive dataflow helps to eliminate duplicates and provides the most current data for insights and analytics.

For example, in an embodiment, input raw data is ingested into the pipeline. The raw data 401 undergoes initial normalization by the facts_modeler 402 to produce output 403, which for example may be considered as the first run of ETL. The output 403 from the first ETL run is analyzed, and used for applying additional normalization during the second run of This process can continue with each ETL run producing output that serves as input for the next run of ETL. The recursive nature of the data flow is used where the data goes through a series of iterations, refining the data during each iteration.

In an embodiment, utilizing recursive functions will aid in processing complex data structures of an enterprise efficiently. The recursive functions are important in data analytics as they allow for efficient querying that can handle complex relationships in large datasets. They are also useful in many use cases of data analytics which involves hierarchical or recursive relationships. In one implementation, recursive functions can be used to generate a hierarchical report of an organization, where details of employees and their descendants can be retrieved. In another implementation, recursive functions can be used to model a hierarchy of nested categories. For example, generating a hierarchical view of products within a particular category, its subcategories or calculating the total number of products within each category. In another example, recursive functions can be used in manufacturing process, where a hierarchy of components is used to build a finished product. The recursive functions can be used to retrieve the components used for producing a specific product or calculate the total cost of the finished product. Thus, recursive functions can be useful for an enterprise that involves handling complex calculations and analyzing large datasets.

Recursive data flow in a data processing pipeline can offer a lot of advantages in scenarios where complex data processing tasks are involved that requires multiple stages of analysis or normalization. Some use cases as discussed above could be navigating and processing organization charts, graph traversals, managing historical data in data warehouses, handling streaming data with varying patterns and dependencies. The recursive data flow in an ETL pipeline enables iterative optimization, where each iteration can improve the quality of the processed data and thereby the efficiency of the pipeline.

FIG. 5 illustrates an exemplary block diagram of a framework to populate data normalization calculations into a dimensional model in accordance with one or more embodiments described herein. In an embodiment, the framework for populating normalization calculations comprises a schema modeler 509 which creates the target schema for the dimensional model. In an embodiment, the metadata tables are created and populated from different data sources, for example, the sensor data 210, 301 configuration data 212, 305 to identify the target schema for the dimensional model. After the metadata tables are created, the schema modeler 509 executes the DDL (data definition language) to create the schema for the facts and dimension tables including the aggregations/calculations table corresponding to the asset type and the tenant. In an embodiment, the dimension tables are populated by a Dims_modeler 508. The dimension tables are populated and surrogate keys are generated for dimensions ensuring that each dimension has a unique identifier. The fact table is populated by a Facts_modeler, which is the execution engine 208, 308 of FIG. 2. The fact table contains numerical values (facts) and foreign keys pointing to the corresponding dimension records. Aggregation calculations may be performed when the fact table is populated. The DDL is triggered based on the metadata information, which creates the tenant databases and tables. Thus, the order of populating the dimensional model would be discovering and populating the metadata tables from the data sources, creating the target schema per tenant by executing the DDL and populating the dimension tables and the fact tables.

In an embodiment, the API 502 may encrypt the SQL queries using an encryption key 501 stored in the Microsoft Azure Key Vault (AKV). The DLA (Azure Data Lake Analytics) API 503 would procure the SQL queries for execution by the execution engine 308. The DLA offers a standard SQL interface, having SQL compatibility and comprehensive built-in functions. DLA allows retrieval and analysis of data from multiple data sources or locations. DLA allows executing SQL queries across multiple data sources with a variety of formats. The queries will be predefined and present in ADLS 504 location as an SQL script. ADLS (Azure Data Lake Store) 504 is an Azure storage offering from Microsoft providing distributed storage file format for bulk data processing needs. The aggregation SQL queries are stored in the encrypted form during normalization phase in the dimensional model. The aggregation SQL queries may be executed by the facts_modeler, i.e. the execution engine 308. In an embodiment, the AKV key 501 may be used to decrypt the SQL query.

FIG. 6 illustrates an exemplary process of performing data normalization calculations of a sample input asset in accordance with one or more embodiments described herein. Specifically, FIG. 6 illustrates how the normalization calculations may occur during query time or "on-demand" instead of being pre-calculated for an input asset type. According to an embodiment, the dimensional model 606 depicted in FIG. 6 corresponds to "asset health facts".

As is known in the art, a dimensional model is a data structure optimized for data warehousing. Facts are the measurements or metrics obtained from the business organization. Dimension provides the context surrounding a business process event. A fact table is a primary table in a dimension model and a dimension table contains dimensions of a fact. The dimensional model is populated by identifying the business process and the data analysis needs of the engineering unit. The next process is identifying the grain, i.e. the level of detail for the business solution/problem. It is the process of identifying the lowest level of information for any table in the data warehouse. If a table contains sales data for every day, then it has daily granularity. If a table contains total sales data for each month, then it has monthly granularity. Further, the dimensions and facts of the business process are identified for building the schema, which is the data structure for the data warehouse. The schema can be either a star schema or a snowflakes schema, as known in the art. A star schema will have a fact table at the center surrounded by dimension tables. A snowflake schema is an extension of star schema, wherein each dimension table is normalized and connected to one or more dimension tables. Snowflake schema is commonly used for business intelligence and reporting in OLAP.

According to some embodiments, normalization calculations and rules may define the level of granularity required for a particular business organization. For example, if the ETL process runs every 6 hours, calculations may be performed at a grain of 30 min/one hour window periods. These pre-calculations would help in populating the fact tables of the dimensional model.

In an embodiment, the dimensional model 606 (211 of FIG. 2) may be populated by the ETL process described in FIG. 2, wherein the input sensor data, configuration data and the results of the executed SQL query are merged to populate the fact table and the dimension tables with metrics and attributes corresponding to the input asset. In some embodiments, similar to SQL queries, UDFs, azure functions, library or lambda expressions could also be used to perform the normalization calculations.

FIG. 6 shows how the base calculations 602, 603, 604, 605 are performed for an asset type "SortLane" during query time. For example, overall equipment effectiveness (OEE) 602 is calculated for a "sortLane" asset type on demand via queries. The attributes used for availability calculation 603 of "SortLane" on demand via queries may be uptime, planned runtime. The attributes used for performance calculation 604 of "SortLane" on demand via queries may be asset_actual_output and total_possible_output. The attributes used for calculation of quality 605 of "SortLane" on demand via queries may be successful_output and total_possible_output.

The OEE metric 602 for the "sortlane" asset may be calculated by the formula Performance*Availability*Quality on the fly during normalization phase. The OEE 602 calculated in this manner is presented on a user interface such as dashboard 601 which can help in building higher level business insights and analytics. The attributes such as the uptime, planned_runtime, asset_actual_output, total_possible_output, successful_output and total_possible_output (per asset type, site, shift, etc.) would be base calculations ingested into the facts table. The aggregation calculations that will be performed in the dashboard 601 are metrics like performance, availability and quality per asset type and site, shift, among others.

OEE is an effective metric using which important insights can be gained on how to systematically improve the manufacturing process. The OEE is a measure of how well a manufacturing operation is utilized (facilities, time and material) compared to its full potential, during the periods when it is scheduled to run. OEE identifies the percentage of manufacturing time that is truly productive. An OEE of 100% means that only good parts are produced (100% quality), at the maximum speed (100% performance), and without interruption (100% availability).

While FIG. 6 depicts the calculations for a "sortLane" type asset, the calculation metrics and attributes of performance, availability, quality may differ from asset to asset.

Few other examples of asset types may be General Conveyor, Shoe Sorter, Bar Code Scanner, AC Motor etc. The dashboard 601 offers the ability to drill down from top levels to lowest level transactions that led to the metric. It is important to note that many variations of these drill-down capabilities can be created specific to the business needs of the organization. The interactive front end dashboard 601 according to various embodiments may be able to provide high-level overview of key performance indicators like the number of data loads, number of rows written, average load time, failed data loads, job status and job statistics for each run, error data, amount of data stored, etc. According to various embodiments, normalization calculations discussed herein may be performed for various asset types on demand via queries thereby providing a multi-tenant solution. The dashboard 601 may be able to provide real time and near real-time updates ensuring that users have access to the most current information. The real-time updates enables businesses to respond quickly to market conditions, identify trends and avoid potential risks.

FIG. 7 illustrates an exemplary method for processing data related to assets within an enterprise in accordance with one or more embodiments described herein. The method, 700 may be implemented by the data processing system, 103 or 203 as described above in FIGS. 1 and 2. Although the embodiments described herein are in the context of an ETL, the various techniques and components illustrated and described in FIGS. 1-6 may be applied to other database management systems in different embodiments that may facilitate normalization of data from one format to another.

The method 700 is illustrated as logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. The order in which the operations are described is not intended to be construed as a limitation, and any number of the described operations can be combined in any order and/or in parallel to implement the method.

The method begins at step 701 wherein data from one or more assets (asset data) from one or more business enterprises may be received. In various embodiments, one or more computing devices 100 of FIG. 1 is configured to receive operational data in relation to one or more assets. In some embodiments, the one or more computing devices 100 may receive data from one or more sensors associated with one or more assets. In some embodiments, the data in relation to assets may be called asset data.

At 702, the asset data may be parsed to identify the type of asset. In some embodiments, the business environment may include physical assets such as sensors, factory equipment, one or more conveyor belts, one or more vehicle components, one or more HVAC components, machines, computing devices, and various other types of assets. Such assets are configured to generate various types of data related to business processes. Sensors, for example may be configured to capture various types of data associated with a premises, building, site, manufacturing plant or process, and the like. Such data is parsed using a parsing tool ANTLR (ANother Tool for Language Recognition) engine 202 or any known parsing tool to identify the type of asset.

At 703, a structured query language (SQL) query is dynamically generated during query time, wherein the SQL query corresponds to the asset type that has been identified in step 602. At 704, the SQL query generated is stored in a metadata repository 305.

At 705, the SQL query is procured from the metadata repository 305 by the execution engine 308 and executed on the input asset data. In some embodiments, the execution engine 308 executes UDFs, Azure functions, library or lambda expression for normalization calculations. The UDFs allow for defining user specific functions for data manipulation and may be useful for complex normalization calculations. For example, if a specific business rule or calculation is to be applied to a particular dataset during normalization phase, the logic for the calculations can be encapsulated in a UDF. In some embodiments, by registering library or lambda expression in the configuration platform, the execution engine 308 may be configured to execute the library or lambda expression for data normalization. In some other embodiments, the customers may have their own azure functions 304, which may be executed by the execution engine 308 and the inputs and outputs to the azure function may be defined via the configuration platform.

At 706, the input asset data is normalized by merging the results of the executed SQL query with the input data, and the configuration data to populate a dimensional model in real time. In one embodiment, the configuration data comprises metadata associated with the one or more assets and an ontology model representing at least one of attributes, characteristics and relationships associated with the one or more assets. In some embodiments, the configuration data may include metadata such as identification information (e.g. an identification that uniquely identifies the asset) for individual assets of the enterprise, type information of the individual assets (e.g. the type of sensor such as a temperature sensor), properties associated with the identification information and/or the type information, locations of the assets (e.g. where exactly the asset is located) within the enterprise. The configuration data may also define relationships between the assets with respect to each other, relationships between types of the assets with respect to each other, and/or roles of the assets and/or types of assets. The configuration data may thus provide domain-specific awareness in relation to one or more assets and asset types. The metadata store is a PostgreSQL in some embodiments. PostgreSQL is a known database management system typically used in data warehousing applications and suited for handling diverse data types and allows defining custom data types, functions and aggregates.

At 707, the configuration data may be dynamically updated with the normalized asset data with a particular business environment. As a result, the method described herein may precisely normalize the raw streaming data with the most current configuration of asset data objects. In one or more embodiments, the normalized asset data can provide information on the assets and corresponding sensors, the engineering units associated with one or more assets, the measurement values captured by the assets and sensors, and the like.

The method 700 discussed herein above may provide a configurable and an integrated data processing pipeline which enhances the operational efficiency of the data pipeline and enriches the data for business intelligence. Further, data lineage may be produced from the ETL process by providing a platform where the sources of input, output and transforms including data/tables are traced and such data can be presented in a graphical form in the future to facilitate business intelligence (BI). The BI tools enable, among other things, dynamic querying of real-time data and historical data. BI technologies may also include reporting, OLAP, analytics, data mining, business performance management, text mining, and predictive analytics.

The FIGURES of the disclosure are provided to illustrate some examples of the invention described. The FIGURES are not to limit the scope of the depicted embodiments or the appended claims. Aspects of the disclosure are described herein with reference to the invention to example embodiments for illustration. It should be understood that specific details, relationships, and method are set forth to provide a full understanding of the example embodiments. One of ordinary skill in the art recognize the example embodiments can be practiced without one or more specific details and/or with other methods.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily refer to the same embodiment). The present disclosure intends to include specific reference to all combinations and sub combinations of physically compatible features, components, apparatuses, and processes described herein. As used herein, the term "or" is used in both the alternative and conjunctive sense, unless otherwise indicated. Use of any such aforementioned terms, or similarly interchangeable terms, should not be taken to limit the spirit and scope of embodiments of the present disclosure. As used in the specification and the appended claims. The singular form of "a," "an," and "the" include plural references unless otherwise stated. The terms "includes" and/or "including," when used in the specification, specify the presence of stated features, elements, and/or components, and/or groups thereof.

In an embodiment, the functional units have been labeled as modules, in order to more particularly emphasize their implementation independence. For example, a module may be implemented as a hardware or a software by various types of processors. A module of executable code may, for instance, comprise one or more physical or logical blocks of computer instructions, which may, for instance, be organized as an object, procedure, or function. Nevertheless, the executables of a module need not be physically located together, but may comprise disparate instructions stored in different locations which, when joined logically together, comprise the module and achieve the stated purpose for the module.

In an embodiment, the functional units have been labeled as modules, in order to more particularly emphasize their implementation independence. For example, a module may be implemented as a hardware or a software by various types of processors. A module of executable code may, for instance, comprise one or more physical or logical blocks of computer instructions, which may, for instance, be organized as an object, procedure, or function. Nevertheless, the executables of a module need not be physically located together, but may comprise disparate instructions stored in different locations which, when joined logically together, comprise the module and achieve the stated purpose for the module.

Aspects of the present disclosure may be implemented as computer program products that comprise articles of manufacture. Such computer program products may include one or more software components including, for example, applications, software objects, methods, data structure, and/or the like. In some embodiments, a software component may be stored on one or more non-transitory computer-readable media, which computer program product may comprise the computer-readable media with software component, comprising computer executable instructions, included thereon. The various control and operational systems described herein may incorporate one or more of such computer program products and/or software components for causing the various conveyors and components thereof to operate in accordance with the functionalities described herein.

A software component may be coded in any of a variety of programming languages. An illustrative programming language may be a lower-level programming language such as an assembly language associated with a particular hardware architecture and/or operating system platform/system. Other example of programming languages included, but are not limited to, a macro language, a shell or command language, a job control language, a script language, a database query, or search language, and/or report writing language. In one or more example embodiments, a software component comprising instructions in one of the foregoing examples of programming languages may be executed directly by an operating system or other software component without having to be first transformed into another form. A software component may be stored as a file or other data storage methods. Software components of a similar type or functionally related may be stored together such as, for example, in a particular directory, folder, or repository. Software components may be static (e.g., pre-established, or fixed) or dynamic (e.g., created or modified at the time of execution).

Processor may be embodied in a number of different ways. In various embodiments, the use of the terms "processor" should be understood to include a single core processor, a multi-core processor, multiple processors and/or one or more remote or "cloud" processor(s). In some example embodiments, processor may include one or more processing devices configured to perform independently. In some embodiments, the processor includes hardware, software, firmware, and/or a combination thereof that performs one or more operations described herein.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Thus, particular embodiments of the subject matter have been described. Other embodiments are within the scope of the following claims. In some cases, the actions recited in the claims can be performed in a different order and still achieve desirable results. In addition, the processes depicted in the accompanying FIGURES do not necessarily require the particular order shown, or sequential order, to achieve desirable results. In certain implementations, multitasking and parallel processing may be advantageous.

In some embodiments, a storage system or other management entity within the artificial intelligence and machine learning infrastructure may also implement automated training with continuous learning based on new data.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed:

1. A method for processing data comprising:
   receiving at least one data from one or more assets within an enterprise;
   parsing the at least one data to identify at least one asset type;
   dynamically generating a structured query language (SQL) query corresponding to the at least one asset type;
   storing the SQL query in a metadata repository;
   executing the SQL query from the metadata repository on the at least one data;
   normalizing the at least one data by merging results of the executed SQL query with the at least one data, and at least one configuration data to populate a dimensional model in real time, wherein the said normalizing the at least one data comprises performing recursive normalization, wherein output data from a normalization run of the recursive normalization is iteratively fed as input for subsequent normalization runs of the recursive normalization to update the dimensional model, and wherein the at least one configuration data comprises metadata associated with the one or more assets and an ontology model representing at least one of attributes, characteristics and relationships associated with the one or more assets, and wherein the ontology model is dynamically updated with normalized data, and wherein the said normalizing includes calculating asset specific metrics for the one or more assets and wherein the calculating of the asset-specific metrics is performed in a multi-tenant environment; and
   dynamically updating the at least one configuration data with the normalized at least one data.

2. The method of claim 1, wherein the at least one data comprises at least one sensor data representing operations of the one or more assets.

3. The method of claim 2, wherein the at least one sensor data is stored in one or more databases.

4. The method of claim 3, wherein the one or more databases is a time series database.

5. The method of claim 1, further comprising parsing the at least one data based on pre-defined grammar rules.

6. The method of claim 1, wherein the dimensional model defines a schema comprising one or more dimensions of the one or more assets.

7. The method of claim 1, further comprising verifying the at least one SQL query by checking syntax and semantics of the SQL query before storing in the metadata repository.

8. The method of claim 1, further comprising the said normalizing the at least one data by registering and executing one or more user defined functions, one or more libraries, one or more lambda expressions and one or more azure functions.

9. The method of claim 1, further comprising the said normalizing the at least one data by executing the SQL query and linking results of the executed SQL query to form a normalization output.

10. A data processing system comprising:
    a processor;
    a memory storing program instructions which, when executed by the processor, causes the processor to:
    receive at least one data from one or more assets within an enterprise;
    parse the at least one data to identify at least one asset type;
    dynamically generate a SQL query corresponding to the at least one asset type;
    store the SQL query in a metadata repository;
    execute the SQL query from the metadata repository on the at least one data;
    normalize the at least one data by merging results of the executed SQL query with the at least one data, and at least one configuration data to populate a dimensional model in real time,
    wherein the said normalizing the at least one data comprises performing recursive normalization, wherein output data from a normalization run of the recursive normalization is iteratively fed as input for subsequent normalization runs of the recursive normalization to update the dimensional model, and wherein the at least one configuration data comprises metadata associated with the one or more assets and an ontology model representing at least one of attributes, characteristics and relationships associated with the one or more assets, and wherein the ontology model is dynamically updated with normalized data, and wherein said normalizing includes calculating asset specific metrics for the one or more assets and wherein the calculating of the asset-specific metrics is performed in a multi-tenant environment; and
    dynamically update the at least one configuration data with the normalized at least one data.

11. The system of claim 10, wherein the at least one data comprises at least one sensor data representing operations of the one or more assets.

12. The system of claim 11, wherein the at least one sensor data is stored in one or more databases.

13. The system of claim 12, wherein the one or more databases is a time series database.

14. The system of claim 10, wherein the parser is configured to parse the at least one data based on pre-defined grammar rules.

15. The system of claim 10, wherein the dimensional model defines a schema comprising one or more dimensions of one or more assets.

16. The system of claim 10, wherein the at least one data is said normalized by registering and executing one or more user defined functions, one or libraries, one or more lambda expressions and one or more azure functions.

17. The system of claim 10, wherein the at least one data is said normalized by executing the SQL query and linking results of the executed SQL query to form a normalization output.

18. The system of claim 10, wherein the at least one SQL query is verified by checking syntax and semantics of the SQL query before storing in the metadata repository.

19. A non-transitory computer-readable storage medium storing program instructions for processing data, the instructions, when executed, perform steps of:

receiving at least one data from one or more assets within an enterprise;

parsing the at least one data to identify at least one asset type;

dynamically generating a structured query language (SQL) query corresponding to the at least one asset type;

storing the SQL query in a metadata repository;

executing the SQL query from the metadata repository on the at least one data;

normalizing the at least one data by merging results of the executed SQL query with the at least one data, and at least one configuration data to populate a dimensional model in real time, wherein the said normalizing the at least one data comprises performing recursive normalization, wherein output data from a normalization run of the recursive normalization is iteratively fed as input for subsequent normalization runs of the recursive normalization to update the dimensional model, and wherein the at least one configuration data comprises metadata associated with the one or more assets and an ontology model representing at least one of attributes, characteristics and relationships associated with the one or more assets, and wherein the ontology model is dynamically updated with normalized data, and wherein the said normalizing includes calculating asset specific metrics for the one or more assets and wherein the calculating of the asset-specific metrics is performed in a multi-tenant environment; and dynamically updating the at least one configuration data with the normalized at least one data.

\* \* \* \* \*